Patented Nov. 6, 1928.

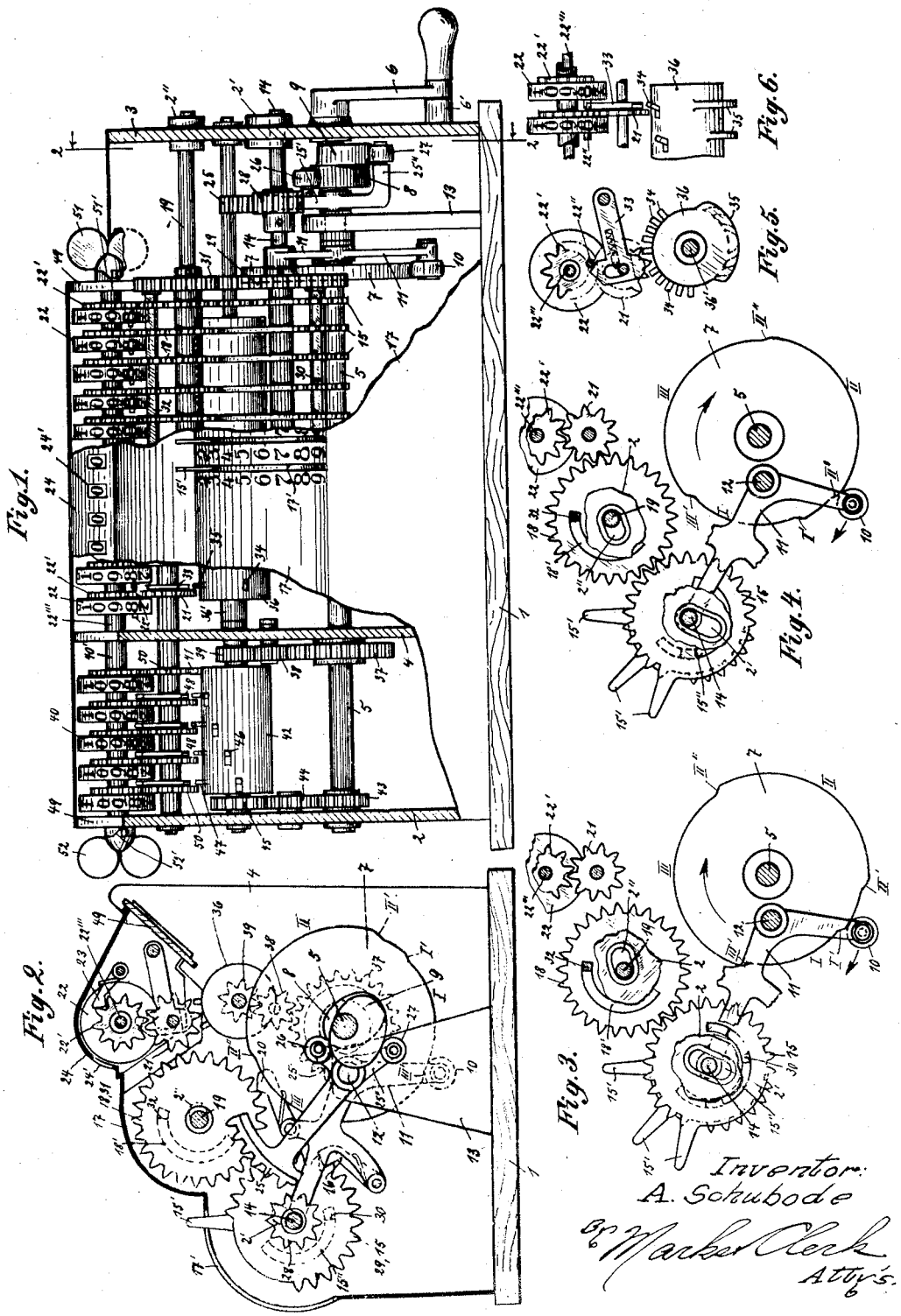
Nov. 6, 1928.                                         1,690,651
A. SCHUBODE
CALCULATING MACHINE
Filed Jan. 5, 1923                 3 Sheets-Sheet 1
Inventor:
A. Schubode
by Marker Clerk
Atty's Nov. 6, 1928.  A. SCHUBODE  1,690,651
CALCULATING MACHINE
Filed Jan. 5, 1923   3 Sheets-Sheet 2
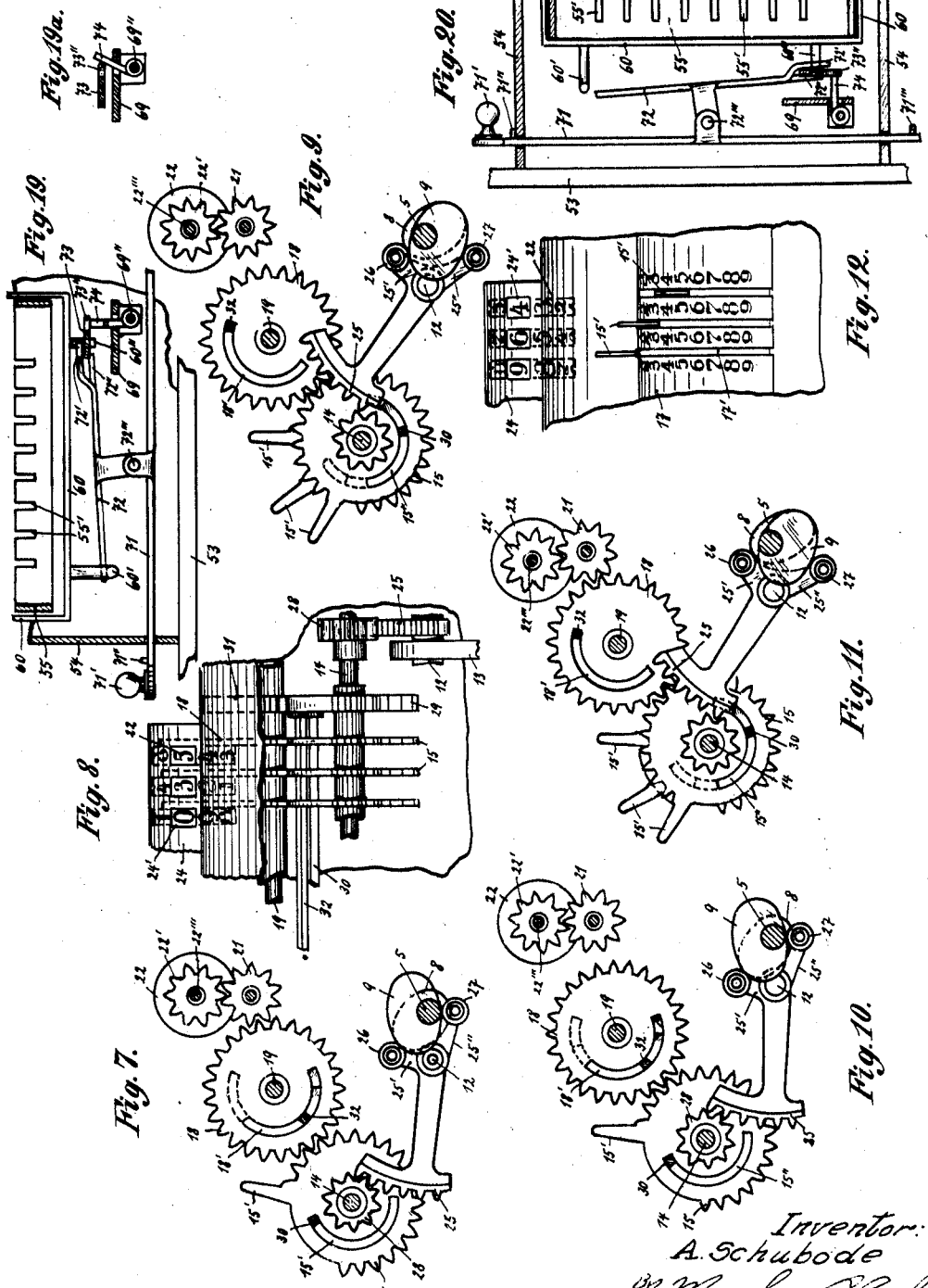
Inventor:
A. Schubode
by Marker Clerk
Atty's Nov. 6, 1928.
A. SCHUBODE
CALCULATING MACHINE
Filed Jan. 5, 1923     3 Sheets-Sheet 3
1,690,651
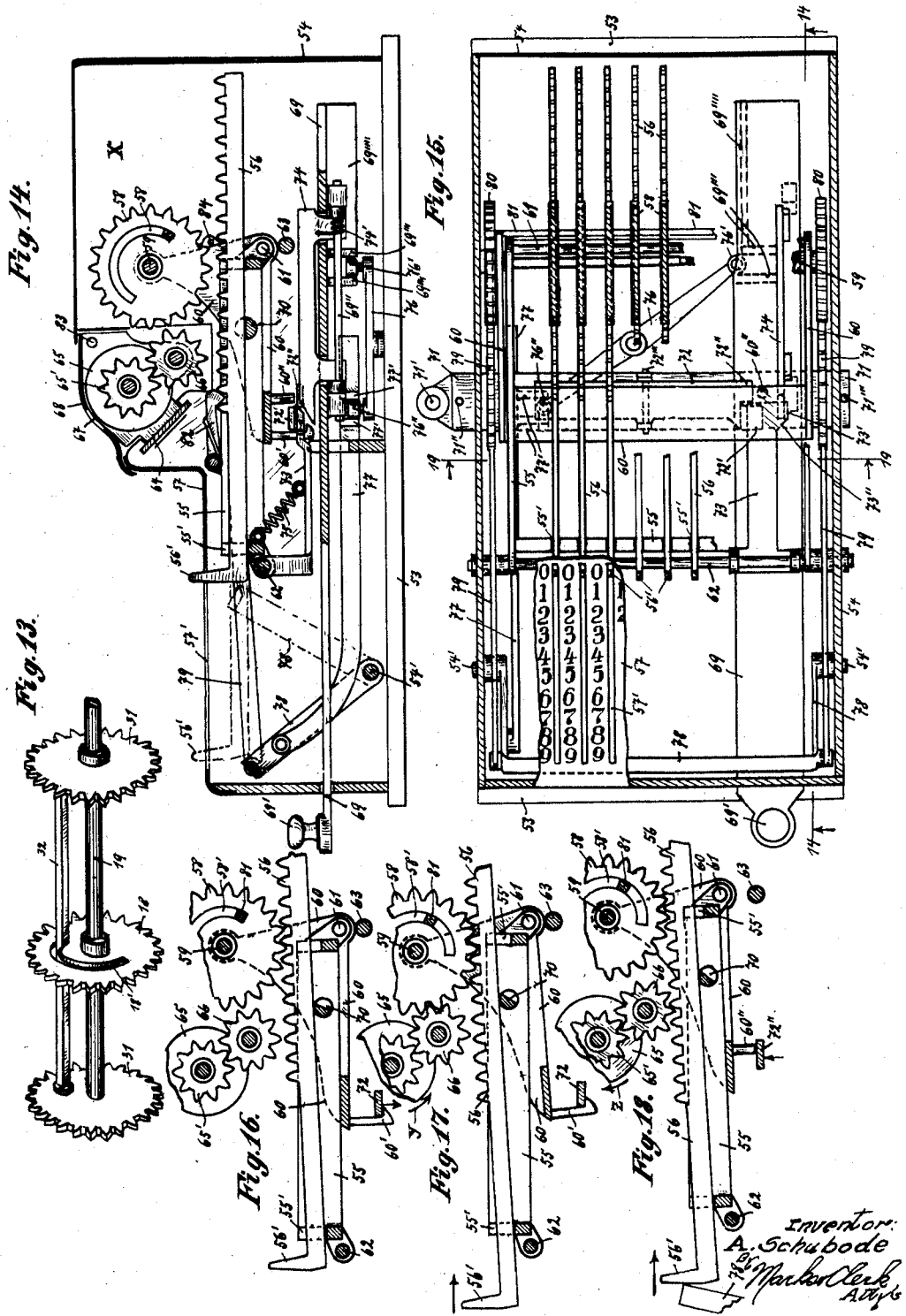

1,690,651

UNITED STATES PATENT OFFICE.

ALBERT SCHUBODE, OF BRUNSWICK, GERMANY, ASSIGNOR TO FIRMA HANNOVERA-KASSEN-GESELLSCHAFT M. B. H., OF PEINE, HANNOVER, DEUTSCHLAND, GERMANY.

CALCULATING MACHINE.

Application filed January 5, 1923, Serial No. 610,934, and in Germany January 14, 1922.

My invention relates to improvements in calculating machines, of which the following is a detailed description.

By my invention a calculating machine is produced with which all four first rules of arithmetic viz addition, subtraction, multiplication and division can be performed in a rapid and sure manner and with the most simple means possible. The fundamental principle of the invention is that the setting-up members, on which the value to be employed in a calculation has to be set-up will, on their being returned to nought-position, transfer the said value directly or indirectly to the calculating members (counting discs) either in an increasing or in a reducing sense. The new calculating machine is cheap to manufacture, as all its principal parts may be pressed of sheet-iron.

In the accompanying drawing Fig. 1 is a front elevation of a calculating machine according to my invention, partly in section and with the casing hood partly removed. Fig. 2 is a transverse section on the line 2—2 in Fig. 1, seen in the direction of the arrows, Fig. 3 is a side elevation showing the arrangement for coupling the setting-up members with the calculating-members and the counting members at the moment, when, after the crank has been turned, the previously set-up setting-up members are coupled with the calculating members. Fig. 4 is the same arrangement at the moment when, after the crank has been turned further also the calculating members are coupled with the counting members. Figs. 5 and 6 show in side-elevation and front-elevation, respectively, a part of the tens-advancing gear for the counting members. Fig. 7 is a side-elevation of the operating-gear for the calculating mechanism at the moment when the set-up value is, by the intermediary of the calculating members being transferred in an additional sense to the counting members. Fig. 8 is a front elevation of Fig. 7 with the casing hood partly removed. Fig. 9 is a side elevation of the operating gear for the calculating mechanism at the moment when, after previous disengagement of the calculating members from the counting members, the value has been retransferred from the calculating members to the setting-up members. Fig. 10 is a side-elevation of the operating gear for the calculating mechanism at the moment when the value set-up on the setting-up members has, by these having been returned to nought position, been, for the first, transferred to the calculating members only, in the present instance, for subtraction. Fig. 11 is a side elevation of the operating gear for the calculating mechanism at the moment when the setting-up members and the calculating members are, according to Fig. 10, engaged also with the counting members and these have, at a simultaneous resetting of the setting-up members, been turned in a subtractive sense. Fig. 12 is a part front elevation of Fig. 11 with the casing top in position, and Fig. 13 is a perspective view of a part of the operating gear for the calculating machine with one single calculating member. Fig. 14 is a vertical section on the line 14—14 in Fig. 15, showing a modification of the new calculating machine, in which, in place of the wheels serving as setting-up members in Figs. 1–13, racks are employed as setting-up members. Fig. 15 is a part plan to Fig. 14 with the casing top removed to the greater part. Figs. 16, 17 and 18 are side-elevations showing the coupling of the setting-up,—the calculating—and the counting-members according to Figs. 14 and 15 in the positions corresponding to addition or multiplication, and subtraction or division, respectively. Fig. 19 is a part sectional view on the line 19—19 in Fig. 15, showing the arrangement for coupling the setting-up members and the calculating members with the counting members at a position of the parts corresponding to Fig. 17 for addition. Fig. 19ª shows a controlling part of Fig. 19 in disengaged position. Fig. 20 shows the same arrangement as Fig. 19 in a position corresponding to the position of parts according to Fig. 18 for subtraction.

On a bed-plate 1 are vertically fitted two sides 2 and 3 and an intermediary partition 4, forming the bearings for a driving shaft 5, which, by means of a crank handle 6 (Fig. 1) can be turned round to the right or the left. Turning to the right corresponds to increasing calculations (addition or multiplication), whilst turning to the left corresponds to decreasing calculations (subtraction or division). To the shaft 5 are fitted a cam disk 7 and two cams 8 and 9 which are close to each other. Against the circumference of the cam 7 bears a roller 10 fitted to a double-armed lever 11 pivoted on a pin 12 in a standard 13 standing on the bed-plate 1. The other arm of lever 11 carries a long pin 14 parallel to the driving shaft 5, on which are revolubly fitted toothed wheels or toothed sectors 15 spaced from each other. These revoluble wheels 15 which are secured in their position by means of spring pawls 16 or the like, form the socalled setting-up members on which the person operating the machine sets up the value to be used in the machine. For this purpose the said wheels 15 are provided with radially extending handles 15' which extend through slots 17' in the casing cover 17 (Fig. 2). Beside these slots 17' numerals 0–9 are marked, as may be seen in Figs. 1 and 12, whereby setting up the said wheels to the given value is facilitated. Opposite to the said setting-up members 15 are disposed toothed wheels or toothed sectors 18, which are freely revoluble on a shaft 19 parallel to the shafts 5 and 14. These wheels, which by means of spring pawls 20 or the like are prevented from turning when not required, form the socalled calculating members and lie in the same planes as the corresponding setting-up members 15. In these same planes, furthermore, are disposed toothed wheels 21, opposite to the calculating members 18 and engaging gears 22' integral with counting discs 22. These discs 22, which are likewise by means of spring pawls 23 secured in their respective positions form the socalled counting members. They bear at their circumference the numerals 0–9 which travel beneath windows 24' in the hood 24 of the casing. The two shafts 14 and 19 allow of such a transverse displacement, that the calculating members 18 can be coupled either with the setting-up members 15 alone, or simultaneously with the setting-up members 15 and with the counting members 22.

When the setting-up members 15 are, by turning about shaft 14, set to a value which shall be transferred in additive sense to the counting discs 22, the members 15, after they have been set-up, are engaged with the counting members 18 by lifting shaft 14. When thereupon the members 15 are returned into their zero position their value is transferred to the members 18. If previously the members 18 have by means of the wheels 21 been engaged with the counting members 22, the value will be transferred from the setting-up members on to the counting members 22 which show it in the windows 24'. When, now, the coupling between the members 22 and 18 is disengaged, the members 18 can be returned into their zero-position and the members 15 coupled to them can again be set-up to the given value. For a repeated transferring of the value to the counting members 22, that is, for example, for a multiplication (continued addition) it is only necessary to reengage the coupling between the calculating members 18 with the members 22 and the setting-up members 15, and to return the latter to zero.

When the setting-up members 15 are by turning around their shaft 14 set to a value, which shall be transferred to the counting discs 22 in a subtractive sense, the members 15 and 18 are, after such setting-up engaged with each other by lifting shaft 14. By returning the members 15 into zero position their value is then transferred to the calculating members 18. Accordingly, if, by raising the shafts 14 and 19, the connection of the calculating members 18 with the counting members 22, is established, then, by setting the members 18 at zero whereby the members 15 are again turned to their adjusted position of value, the value can be transferred to the counting members 22, this time subtractively. A repeated transfer in this manner would constitute a division. After each transfer the coupling between the members 15, 18 and 22 is disengaged. After each transfer operation the coupling between the members 15, 18 and 22 is disconnected after, as above stated, each time by zero setting of the members 18, the setting members 15 have been reset into their set value, so that these members, when the three members 15, 18 and 22 are uncoupled, stand in their set positions. This position is maintained by the members 15 after each uncoupling of the three members 15, 18 and 22 as long as it is desired to subtractedly calculate with the same set value.

My machine is provided with arrangements which will fully automatically perform the necessary couplings and turnings (returning to zero position) by which the value set-up at 15' is transferred to the counting discs 22 in an additive or subtractive sense. The operator need only set up the respective value on the members 15, 15' and then turn the crank 6 for addition to the right, for subtraction to the left, and this for additions and subtractions once only, for multiplications or divisions several times round. In the following these arrangements for automatically coupling and turning the members 15, 18 and 22 will be described, reference being had to the constructional form shown by way of example in Figs. 1–13.

The cam disc 7 fitted to shaft 5, against which bears the roller 10 of the lever 11 carrying the setting-up members 15 under action of the gravity of the parts 11, 14 and 15, has as shown in Figs. 2, 3 and 4, along its periphery 3 lifting sections I, II, and III. Fig. 2 shows the position of the cam disc 7 when the crank 6 is at rest, in which position it can be secured by a locking lug 6' (Fig. 1). When the crank is turned to the right, after the first two members 15 have been set, say to the value 35 which is to be transferred in an additive sense, the cam section I' on the cam disc 7 will, by forcing off the roller 10 effect the engaging of the members 15 and 18. This position is shown in Fig. 3. While turning about pin 12 the shaft 14 can slide in an arcuate slot 2' in the side wall 3. When, the crank 6 is turned still further, the cam section II' will by further lifting the roller 10, lift the setting-up members 15 and the calculating members 18, which are above and in engagement with them, so far that an engagement is also obtained between the members 18 and 22, or their respective gears. This moment is shown in Fig. 4. By this time the crank has performed one third of a full rotation. The shaft 19 likewise slides in a slot 2" in the sidewall 3 (Figs. 1, 3, 4). While the crank is being turned through the second third of a rotation, the cam section II will maintain the engagement of the members 15, 18 and 22. At the end of section II the cam II" will cause the disengaging of the members 18 and 22 so that during the last third of the rotation of crank 6 (cam section III) only the members 18 and 15 will be in engagement (Fig. 3) and when one full rotation has been completed also the section cam III' will disengage the members 18 and 15.

If the crank 6 is turned to the left, the rising and falling cams of the cam disc 7 will act in the reverse sense. The cam III' will, immediately on the crank being turned cause the engaging of the members 15 and 18, and at the end of the first third of the rotation the cam II" will engage the members also with the counting members 22 so that, at the second third of a rotation the members 15, 18 and 22 will be engaged according to Fig. 4. Thereupon the cams II' and I' of the cam disc 7 will at the beginning of the last third of a rotation successively cause the disengaging of the members 18 and 22 and 18 and 15, respectively. At such disengagement the shaft 19 with the counting members 18 will, under action of gravity sink to the bottom of slot 2" (Fig. 3).

In the foregoing the means have been described which, on the crank being turned, will effect the fully automatic coupling of the setting-up, the calculating and the counting members 15, 18 and 22. The means which during such coupling effect the rotation of the setting-up and the calculating members 15 and 18 for the purpose of transferring the values to the counting members (counting discs) 22 are shown in a constructional form, by way of example, in Figs. 1-13 and shall now be described in the following.

On the pin 12, on which rocks freely the lever 11 operated by the cam disc 7, also rocks a toothed sector 25 which may, for example, be separated from lever 11 by the standard 13 (Fig. 1). This sector 25 has two arms 25' 25" projecting beyond the pin 12, of which arms the one, 25' carries a roller 26 and the other 25" a roller 27 (Figs. 1, 2, 7, 9, 11). The roller 26 bears from above against the cam 8 on the main shaft 5, while the roller 27 bears from below against the cam 9 of shaft 5 so that both cams are practically engaged between a bifurcation of the toothed sector 25 (Figs. 1 and 2). To shaft 14 of the setting-up members 15 is fitted a small toothed wheel 28, lying in the plane of the toothed sector. To shaft 14 are further fitted two toothed wheels 29 which are coupled by a bar 30 running parallel to the shaft 14. In Fig. 1 the left wheel 29 is covered by the casing plate 17. The bar 30 passes through approximately semi-circular slots 15" in the setting-up members 15, so that these can be set-up (turned) by hand independently of the bar 30 as may be seen from Fig. 3. To the shaft 19 of the calculating members 18 are likewise fitted two toothed wheels 31 which are likewise coupled by means of a bar 32 running parallel to shaft 19. This bar 32 passes through curved slots 18' in the calculating members 18, as shown perspectively in Fig. 13. The wheels 29 and 31 and the pitch of the teeth of the setting-up and the calculating members 15 and 18 are all of the same diameter and besides each wheel 29 is opposite a wheel 31 and in the same plane (Fig. 1). The consequence is that when the calculating members 18 are coupled with the setting-up members 15 (Figs. 3 and 4) the wheels 29 and 31 will also engage with each other.

When the crank 6 is in position of rest the sector 25 will have the position as shown in Fig. 2 and it is of such dimensions that when the crank 6 is turned to the right it will engage with the wheel 28 only at that moment when the cam disc 7 has coupled the calculating members 18 with the setting-up members 15 and the counting members 22 (Fig. 4). The cams 8 and 9 are of such shape that at such moment they will commence the downward movement of the sector 25 and will complete this downward movement during the second third of the rotation of crank 6 (Figs. 7 and 8). By aid of the toothed wheel 28 and the two pairs of gears 29, 31 the sector 25 will advance the two bars 30 and 32 towards each other (Fig. 7) whereby all, previously set-up setting-up members 15 are returned to 0, however, all calculating members in engagement with, 18 are turned to the respective indicating positions (Fig. 7). The corresponding counting members 22 are likewise turned into the positions corresponding to the respective values set-up so that the value, previously set-up at 15', viz "35" now will appear in the windows 24' (Fig. 8). Thereupon, after the engagement between the members 18 and 22 has been disengaged, the two cams 8 and 9 will commence to return the sector 25 into its position of rest according to Fig. 2 which returning is effected during the last third of the crank revolution. Thereby also the two bars 30 and 32 which previously approached each other, swing back into the position shown in Fig. 2 whereby they return all calculating members 18 to zero and thereby again bring the members 15 which are still in engagement with these, back into their originally set-up position (Fig. 9). At the end of the rotation of the crank, when the members 15 and 18 separate, also the engagement between the sector 25 and the wheel 28 separates. The pawls 16, 20 and 23 hold the members 15, 18 and 22 in their respective positions. On the crank, now, being again turned to the right, the value set up at 15' is again transferred to the counting gear 22, and so on.

If the crank 6 is, for subtraction or division, turned to the left whereby the cam III' of cam disc 7 immediately causes the coupling of the setting-up members 15 with the calculating members 18, the cams 8 and 9 will, now during the first third of the rotation of crank 6 draw the sector 25 downwards. Thereby, under action of the bars 30 and 32 the members 15 are turned to zero and accordingly the calculating members 18 coupled to them into the corresponding value indicating positions (Fig. 10). During the second third of the rotation of crank 6, during which the cam disc section II holds the calculating members 18 also in engagement with the counting members 22, the cams 8 and 9 will raise the sector 25 into its position of rest according to Fig. 2 (Fig. 11), whilst the calculating members 18 return into their 0 position and thereby transfer their values in a subtractive sense to the counting members 22. At the same time the setting-up members 15 are again returned to the originally set-up value. During the last third of the rotation of the crank 6, during which the cam sections II' and I' will, cause the disengaging of all members 15, 18 and 22, which the cams 8 and 9 will retain the sector 25 in its position of rest according to Fig. 2.

The counting discs 22 are fitted with suitable tens-advancing devices which will, in well known manner advance the neighbouring discs by one unit forward or backwards when the counting discs 22 pass from 9 to 0 (and vice versa). In the accompanying drawing hammer-shaped levers 33 have been indicated by way of example (Figs. 1, 2, 5, 6) which are forced off by lugs 22'' on discs 22 and are pushed into the path of rotating feed teeth 34 which may be shifted sideways. These feed teeth 34 are pushed by the bevel of levers 33 into the gear wheels 21 of the neighbouring counting disc 22, whereby said gears together with their respective disc 22 are advanced by one tooth. The cams 35 which may together with the feed teeth 34 be fitted on a common drum 36 (Figs. 5 and 6) will, after the ten-feed has been effected, return the levers 33 into the path of the lugs 22''. For the right and the left-hand rotation of crank 6 a separate set of feed teeth 34 and cams 35 must be provided, and the teeth and cams of each group should be helically arranged with regard to each other. The drum 36 is driven from the crank shaft 5, for example, by means of a wheel 37, which by aid of an intermediate gear 38 turns another gear 39 fitted to shaft 36' of the drum 36. The ratio of gearing between the wheels 37 and 39 is 1:3, so that the drum will perform a whole revolution for each section I, II, III of the cam disc 7. It is nevertheless impossible for a wrong or repeated ten-advance to be performed, as the ten-advancing levers 33, immediately after effecting the advance, are returned by cam 35 into inoperative position.

For counting the rotations of the crank a so-called rotation or quotient gear is employed which is disposed co-axially to the counting gear 22 and consists of counting discs 40 (Fig. 1). This quotient gear 40 will, at each revolution of the crank, be advanced by one tooth 41 a single unit forward or backwards, respectively. The said tooth 41 is fitted to a drum 42 which is coupled by gears 43, 44, 45 to the crank shaft 5, and may, at the same time, bear the tens-feed pins 46 and the cams 47 for the tens-feed devices 48 of this counting gear 40.

The two co-axial counting gears 22 and 40 are fitted to a slide 49 (Fig. 2) which is shiftable parallel to the counting gear shaft 22'''. This shifting has as its object to transfer values set-up on the members 15, 15' to counting discs of higher figures, thus, for example, to multiply by 10, 100, 1000 and so on or divide thereby, respectively. The single tooth 41 is then correspondingly placed opposite to a gear wheel 50 of the second, third, and so on, counting disc 40. In Fig. 1 the counting gear slide 49 is shown in its initial position, thus farthest to the left, so that the tooth 41 acts on a unit disc 40. This shiftable arrangement of counting gears is already known in calculating machines.

For returning the two counting gears 22 and 40 to zero after each calculation butterfly handles 51 and 52, respectively are provided which are fitted to the shafts 22''' and 40' and by means of which these shafts may be turned. Thereby the bevels 51' and 52' of these handles produce an axial displacement of their respective shafts 22''' and 40' whereby the abutments of the shafts are moved behind lugs on the counting discs and these are returned into zero position. For simultaneously returning all setting-up members 15 into zero-position after a calculation has been completed a strap rocking on shaft 14 and engaging behind the handles 15', or a dogging shaft may be used, the dogs of which engage behind lugs on the setting-up members may be employed. Such devices for returning to zero-position are known.

The constructional form shown in Figs. 14 to 20 essentially differs from the one hereinbefore described and shown in Figs.

1–13 by the setting-up members not having the form of rotatable gear wheels or toothed sectors, but are rectilinearly shiftable racks, and that, in place of a revoluble operating crank a slide is employed as the operating medium.

In the box-shaped casing 54 fitted to a bed-plate 53 is disposed a frame 55, having incisions 55' in two opposite walls (Figs. 19, 20). In these incisions 55' are fitted parallel rack slides 56 extending with handles 56' through slots 57' of the horizontal casing-top 57 (Fig. 14). Beside the slots 57' the numerals 0–9 are marked (Fig. 15) to which the rack slides 56 which here form the setting-up members may be set. Fig. 14 indicates at one point by dotted lines the setting-up of a slide 56 to "9". Besides the slides (setting-up members) 56 the calculating members 58 are also disposed on said frame 55, these calculating members having the same shape as the members 18 in Figs. 1–13, and being journalled freely revoluble on a shaft 59, as shown in Figs. 13, 16, 17 and 18 while this shaft 59 is journalled in a framelike rocker 60 which is hinged by means of pins 61 to the frame 55. The frame 55 carrying the setting-up slides 56 and the calculating members 58 rocks with its front edge on an axis 62 and bears with its rear edge on a fixed abutment of the casing (a shaft or a lath) 63 (Fig. 14). Above the frame 55 and the setting-up racks 56 the counting discs (counting members) 65 are journalled in a slide 64 which is transversely shiftable to the direction in which the members 56 slide (Fig. 14) their gear wheels 65' 66 lying in the same planes as the racks 56. These counting discs revolve beneath windows 67 of a cover plate 68 and are provided with tens-advancing gear and means for returning them to 0 position, which may be the same as with the counting discs 22 according to Figs. 1–13. For simplifying the drawing these devices and means, which may be of any known design, have not been shown in the drawings. For the same reason a recording counting gear which corresponds to the quotient gear 40 in Figs. 1 and 2, and which records the operations of the hereinafter described operating member 69 (Figs. 14 and 15) has not been shown. Such counting gear might, for example, be arranged at the place marked $x$ in Fig. 14 and be advanced by one unit by means of a rocker, a pawl, or a revolving feed tooth each time the slide 69 is operated, such advance being forward or backward, according to the kind of calculation performed.

Through the frame 55 extends an eccentric shaft 70 which at the position of rest of the setting-up racks 56 will just be in contact with these racks as shown in Fig. 14. When a calculation is to be performed, the setting-up racks are set by hand to the value to be transferred into the counting gear 65 the same as with the machine according to Figs. 1–13, and thereupon the eccentric shaft 70 is each time turned through an angle of 120° (or 180°) by hand, Figs. 16–18. Hereby all setting-up racks 56 are lifted so far that they engage with the calculating members 58 (Figs. 16–18). According to whether an addition or subtraction is to be performed, the calculating members 58 coupled with the setting-up members 56 are also coupled with the counting members 65 (Fig. 17) or the setting-up members 56 in engagement with the calculating members 58 are also engaged with the counting members 65 (Fig. 18). In the former instance (addition) the rocker 60 on the frame 55 is inclined until the calculating members 58 engage with the gear wheels 66 of the counting discs 65 (Fig. 17), in the latter instance (subtraction) the frame 55 with the rocker 60 is swung upwards on its axis 62, thus lifted with its rear edge off the supporting abutment 63 (Fig. 18). Either of these couplings is performed by means of the hereinafter described arrangement before the aforementioned operating slide 69 having a handle 69' is operated.

Beneath the frame 55 a slide 71 extends across the machine casing 54 (Figs. 14, 15, 19, 20) said slide 71 having a knob-handle 71' and two stops 71'' and 71''' limiting its two terminal positions. On this cross slide 71 is fitted a rocker 72 having at one end two fork tines 72' and 72'' of different length (Figs. 19, 20). By moving the slide 71 to the left the rocker 72 can be laid with its left end on a hook 60' of the rocker 60 carrying the calculating members, whereby its right end which is forked, will engage around a pendulum 73 swinging on the axis 62, so that the longer tine 72' will lie beside a pin 60'' of the rocker 60, the shorter tine 72'' will be immediately in front of this pin 60'' (Fig. 19). The pendulum is situated above a cam bar 74 which is pivoted to the operating slide 69 on a pin 69'' and is, by means of a spring 74' permanently forced into the path of the pendulum 73. If, now, at such position of the cross slide 71, as shown in Fig. 15 corresponding with an additive calculation, the operating slide 69 is drawn forward, the bar 74 will immediately lift the pendulum 73 which turns the rocker 72 on its pivot 72''' and thereby, by means of hook 60' pulls down the rocker 60 carrying the calculating members (Fig. 19). In consequence thereof the calculating members engage the counting disc wheels 66, as shown in Fig. 17. They remain in engagement during the whole forward stroke of the slide 69 until at the end of this stroke the cam bar 74 slides off the lateral ear 73' (Fig. 15) of the pendulum 73 and a spring 75 forces up the pendulum 73 and thereby also drives back the rocker 60 into its position as shown in Fig. 16. On the slide 69 returning to its previous position a bevel 73" on the pendulum 73 will throw off the cam bar 74 (Fig. 19ᵃ) so that it passes the pendulum inoperatively and, at the end of the return, again rights itself under action of its spring 74' (Fig. 14) and is again in front of the pendulum. At each repeated advance of the slide 69 this engagement according to Fig. 17 is repeated.

When the cross slide 71 is set to the right (Fig. 20) the left arm of the rocker 72 is removed away from the hook 60', but the shorter tine 72" is pushed beneath the pin 60" of the rocker 60. When, now, the operating slide 69 is drawn forward, its cam bar 74 will lift the pendulum 73 and the rocker 72, while the tine 72" will also lift the rocker 60. The latter engages beneath the frame 55 (Fig. 20) so that also this frame is lifted (rocked on its axis 62) whereby all setting-up members 56 are engaged with the gears of the counting discs 66 (Figs. 18 and 20). At the end of the forward stroke of the slide 69 the cam bar 74 will release the pendulum 73 in the aforedescribed manner and on the slide 69 reaching its terminal position the bar 74 will adjust itself in readiness for a renewed advance of slide 69.

The transferring of the value set-up from the setting-up members 56 to the counting members 65 during the operation of the operating slide 69 is obtained by means of the arrangement described in the following. To the bed-plate 53 is pivoted a double-armed lever 76 (Figs. 14 and 15) which with its one end 76' engages between lugs 69''' on the operating slide 69, while its other end 76'' engages between the lugs 77' of a link 77. In consequence thereof the said link will, on the slide 69 being advanced and returned, be moved backwards and again forwards. The link 77 is provided with a U-shaped strap 78 linked thereto, which is pivoted on a pin 54' in the casing 54. The strap 78 which is moved back and forward by said link 77 rocks in the path of the handles 56' of the setting-up racks 56. To the strap 78 are linked two racks 79 which engage with pinions 80. These pinions 80 are fitted to the shaft 59 of the calculating members 58 and coupled by a bar 81, which extends parallel to the shaft 59 and passes through curved slots 58' in the calculating members 58. As regards their arrangement and their operation the strap 78 and the bar 81 exactly correspond to the bars 30 and 32 in the Figs. 1–4, 7–11 and 13. They serve for alternately setting up and returning the members 56 and 58.

For additive calculations, when the cross slide 71 has, according to Figs. 15 and 19, been set-up the set-up members 56 transfer their value in the following manner to the counting discs 65. On the slide 69 being drawn forward the strap 78 draws the set-up members 56 back into 0 position whereby the corresponding calculating members 58 and the counting discs 65 coupled to them are according to Fig. 17 turned into the value-indicating positions (arrow y in Fig. 17). The bar 81 thereby rocks inoperatively in the curved slots 58'. After the connection between the members 58 and 65 has been disengaged, namely in the moment in which the pendulum 73 slips off the cam bar 74 of the advanced slide 69 and the latter commences its return stroke, the bar 81 in rocking back will return the calculating members 58 into the zero-position, whereby the setting-up members 56 are again set-up. The transfer of the value to the counting discs may be repeated any number of times by drawing forward and returning the operating slide 69, whereby the tens-advancing means which have been mentioned but are not shown may provide for a proper addition in the counting gear 65. On drawing forward the operating slide 69 it may, for example, be given an extra length of stroke beyond that required for coupling and operating the members 56, 58 and 65, which extra stroke may be employed for operating the tens advance in the counting gear 65. The roller 76' (Figs. 14 and 15) may then inoperatively glide along a guide bar 69''''. A quotient gear of any suitable kind may be used to count the individual operations of the operating slide 69. For calculations at higher figures it is only necessary to accordingly shift the slide 64.

For subtractive calculations, when the cross slide is set according to Fig. 20, the strap 78 will, on the slide 69 being drawn forward, return the setting-up members 56 into their zero position whereby the counting members 65 coupled with them according to Fig. 18 move into the corresponding indicating positions (arrow z in Fig. 18, which is in a direction opposite to that of the arrow y in Fig. 17, and thus expresses a subtractive transfer). At the same time the calculating members 58 coupled to the setting-up members 56 are moved into the indicating position, while the bar 81 travels inoperatively in the curved slots 58'.

When, then, at the end of the forward stroke of the operating slide 69, by the pendulum 73 slipping off the cam bar 74 the frame 55 is lowered and thereby the connection between the members 56 and 65 is disengaged (Fig. 16) the bar 81 will, at the now commencing return stroke of slide 69 (after the tens advance) return all calculating members 59 into 0 position whereby the setting-up members 56 are again set-up. By a repeated operation of slide 69 the value set up can be transferred any number of times in a subtractive sense (division) to the counting gear 65.

At the completion of a calculation, be it in an additive or a subtractive sense, the eccentric shaft 70 is returned into the position according to Fig. 14 whereby the setting-up members 56 are disconnected from the calculating members 58.

In Fig. 14 elastic pawls 82 are indicated which are intended to secure the setting-up members 56 in their respective positions. Like or similar pawls or retaining devices must also be provided for the counting members 65 and the calculating members 58. In Fig. 14 these safety mechanisms may, for example, be journalled on the pins 83 and 84 indicated for this purpose.

The engaging and disengaging, respectively of the members 15, 18 and 22, and 56, 58 and 65 may also be obtained by an axial displacement of these members or some of them and my invention shall not be restricted to the constructional forms here shown and described.

I claim:

1. In a calculating machine having a setting-up member the return to zero position of which is utilized for transferring the value set-up, and a counting member, and a calculating member disposed between the setting up and counting members and adapted to receive the value set-up from the setting-up member and pass it on to the counting member, a crank device including a shaft and adapted, on being turned, to couple the calculating member with the setting-up member and the counting member and to transfer the value, a cam disc on the shaft of said crank, a carrier for the setting-up member coacting with said cam disc, said cam disc adapted, on the crank being turned, to first couple the setting-up member with the calculating member and then advance both until the calculating member engages the counting member, and again disengage the calculating member first from the counting member and thereafter from the setting-up member before a full revolution of the crank is completed.

2. In a calculating machine having a slotted setting-up member the return to zero position of which is utilized for transferring the value set-up, and a counting member, and a calculating member disposed between the counting and setting-up members and adapted to receive the value set-up from the setting-up member and pass it on to the counting member, a crank shaft adapted, on being turned, to couple the calculating member with the setting-up member and the counting member and to transfer the value, a cam disc on the crank shaft, a carrier for the setting-up member coacting with said cam disc, said cam disc adapted, on the crank shaft being turned, to first couple the setting-up member with the calculating member and then advance both until the calculating member engages the counting member, and again disengage the calculating member first from the counting member and thereupon from the setting-up member before a full revolution of the crank shaft is completed, the setting-up and calculating members having slots therein, two bars, oscillating in opposite directions around the axes of the setting-up member and the calculating member, respectively, and passing through the slots therein, and means for coupling the bars together and imparting movement thereto from the crank shaft.

3. In a calculating machine having a slotted setting-up member, the return to zero position of which is utilized for transferring the value set-up, and a counting member, and a calculating member disposed between the setting-up and mounting members and adapted to receive the value set-up from the setting-up member, and pass it on to the counting member, a crank shaft adapted, on being turned, to couple the calculating member with the setting-up member and the counting member and to transfer the value, a cam disc on the crank shaft, a carrier for the setting-up member coacting with said cam disc, said cam disc adapted, on the crank shaft being turned, to first couple the setting-up member with the calculating member and then advance both until the calculating member engages the counting member, and again disengage the calculating member first from the counting member and thereupon from the setting member before a full revolution of the crank shaft is completed, the setting-up and calculating members having slots therein, two bars, oscillating in opposite directions around the axes of the setting-up member and the calculating member, respectively, and passing through slots therein, and means for coupling the bars together and imparting movement thereto from the crank shaft, including a toothed sector, two lifting cams on the crank shaft adapted to operate said sector, said sector being adapted to be actuated while the setting-up member is coupled to the calculating member.

4. In a calculating machine having a value-setting member, the resetting of which to zero position serves for value-transferring, a calculating member adapted to be coupled with the setting member cooperating with the latter after the coupling whereby it receives the value while the setting member is moved back into the zero position and in its return to zero position returns the value to the setting member, a counting member adapted to be coupled with the calculating member in such a manner that it receives the value either in the resetting movement of the setting member to zero position or in the resetting movement of the calculating member to zero position, whereby either multiplications or divisions are effected on the counting member.

In testimony whereof I have affixed my signature.

ALBERT SCHUBODE.